United States Patent [19]

Holmes, Jr. et al.

[11] 3,943,494

[45] Mar. 9, 1976

[54] DISTRIBUTED EXECUTION PROCESSOR

[75] Inventors: Arthur Wilbert Holmes, Jr., Woodstock; Price Ward Oman, Wappinger Falls; Richard Charles Paddock, Kingston; Donald Walter Price, Lake Katrine, all of N.Y.

[73] Assignee: International Business Machines Corporation, Armonk, N.Y.

[22] Filed: June 26, 1974

[21] Appl. No.: 483,270

[52] U.S. Cl. .................................. 340/172.5
[51] Int. Cl.² G06F 15/16; G06F 9/19; G05B 13/02
[58] Field of Search .............. 445/1; 340/172.5

[56] References Cited
UNITED STATES PATENTS

| | | | |
|---|---|---|---|
| 3,370,274 | 2/1968 | Kettley et al. | 340/172.5 |
| 3,462,742 | 8/1969 | Miller et al. | 340/172.5 |
| 3,470,540 | 9/1969 | Levy | 340/172.5 |
| 3,537,074 | 10/1970 | Stokes et al. | 340/172.5 |
| 3,602,900 | 8/1971 | Delaigue et al. | 340/172.5 |
| 3,701,113 | 10/1972 | Chace et al. | 340/172.5 |
| 3,716,843 | 2/1973 | Schmitt et al. | 340/172.5 |
| 3,764,995 | 10/1973 | Helf et al. | 340/172.5 |
| 3,771,136 | 11/1973 | Heneghan et al. | 340/172.5 |
| 3,781,823 | 12/1973 | Senese et al. | 340/172.5 |
| 3,786,430 | 1/1974 | Hajdu et al. | 340/172.5 |

OTHER PUBLICATIONS

Habayeb, Abdul-Rozzaq, "System Decomposition, Partitioning and Integration for Microelectronics," IEEE, Vol. 4, No. 2, July 1968, pp. 164–172.

*Primary Examiner*—Raulfe B. Zache
*Assistant Examiner*—Jan E. Rhoads
*Attorney, Agent, or Firm*—Karl O. Hesse

[57] ABSTRACT

A processor including a plurality of synchronized subprocessors, each implemented on an integrated circuit substrate and each having an instruction register and instruction executing circuits for independently executing a portion of the functions required by an instruction being simultaneously executed by each subprocessor. Execution is initiated and synchronized by simultaneously loading the same instruction into each subprocessor.

8 Claims, 3 Drawing Figures

DISTRIBUTED EXECUTION PROCESSOR

CROSS REFERENCE TO RELATED PATENT APPLICATIONS

The processor of the invention may advantageously utilize the improved dynamic logic counter of application Ser. No. 369,022 as an instruction counter and the self-sequencing memory of application Ser. No. 334,796 as read only control storage 105 and 205, which applications are incorporated into this specification by reference.

BACKGROUND OF THE INVENTION

1. Field of the Invention

The invention relates to an electrical communications system with storage of signals in general and more specifically an integrated circuit data processor implemented using a plurality of integrated circuit chips.

2. Description of the Prior Art

With the advent of large scale integration LSI, the number of logic gates which can be manufactured on a single integrated circuit chip has increased astronomically, while the ability to make external connections to carry signals to and from each chip has remained relatively constant.

Therefore in order to implement systems using LSI, the system must be organized or partitioned in such a fashion that the largest number of circuits on each chip can be utilized with the smallest number of signal input output connections to the chip.

The problems in system organization created by LSI circuitry are well recognized by many persons skilled in the art, an example being the publication by Abdul-Razzaq Habayeb entitled "System Decomposition, Partitioning and Integration For Microelectronics" which appeared in IEEE Transaction on Systems Science and Cybernetics, Vol. 4, No. 2, July 1968 at pages 164–172.

U.S. Pat. No. 3,462,742 is an example of a prior art system organization.

When the number of logic circuits on a chip is increased by an order of magnitude over the density contemplated in U.S. Pat. No. 3,462,742, a lesser number of chips is required to implement a data processor if each circuit on the denser chips can be efficiently utilized. The system organization of U.S. Pat. No. 3,462,742, however, does not lend itself to efficient utilization of circuits when a data processor is implemented using only two or three LSI circuit chips because this patents teachings require a master control unit.

Another prior art system organization which superficially appears similar to that of the instant invention is described in U.S. Pat. No. 3,537,074. The system of this patent includes a plurality of processors performing the same function upon different data in response to the same instruction. The system organization of this patent is especially valuable when the data to be processed is in the form of matrices or arrays and the same functional operation is to be performed on each element of the array such as a Fast Fourier transformation. Again a master control element 27 is required even though each processor performs an identical function.

Another system organization which is superficially similar to that of the instant invention is the classical multiprocessor organization, an example of which appears in U.S. Pat. No. 3,470,540. Classical multiprocessor system organization differs from the instant invention, however, in that in a multiprocessing system, each processor is performing a different functional operation upon different data in response to different instructions. A special form of the classical multiprocessing system organization is often called pipe line processing wherein a plurality of processors each operate on the results from a previous processor under control of commands from a common control unit. The pipe line processor system organization is also advantageous for array type data processing such as Fast Fourier transformation but is best implemented using a larger number of integrated circuits controlled by a master control unit or timing generator 15 such as described in U.S. Pat. No. 3,176,843.

All of the above recited prior art teachings require master or central control circuitry which must be connected to each integrated circuit chip by input output signal paths.

SUMMARY OF THE INVENTION

It is an object of this invention to improve the system organization of an integrated circuit data processor so as to optimize the utilization of a larger number of logic circuits on each LSI chip.

It is a further object of this invention to implement an LSI circuit data processor using a smaller number of LSI circuit chips than heretofore possible when the functions to be performed by the data processor require a larger number of circuits than can be placed on one chip.

It is a still further object of this invention to reduce the cost of an integrated circuit data processor by improving the system organization so that input output signal paths between LSI circuit chips are reduced to a minimum which in turn allows the data processor to be implemented using a smaller number of LSI circuit chips.

These and other objects of the invention are accomplished by placing instruction decoding and control circuitry on each LSI circuit chip, thereby obviating the need for master or centralized instruction decoding and command generating circuits and attendant input output signal paths. Each integrated circuit chip is thereby enabled to operate as an independent subprocessor which decodes and executes functions specified by each instruction. Further economy in signal paths are achieved by simultaneously loading the same instruction in each LSI circuit chip thereby providing a synchronized starting point for the execution of the instruction.

A PREFERRED EMBODIMENT OF THE INVENTION

Figure 1:
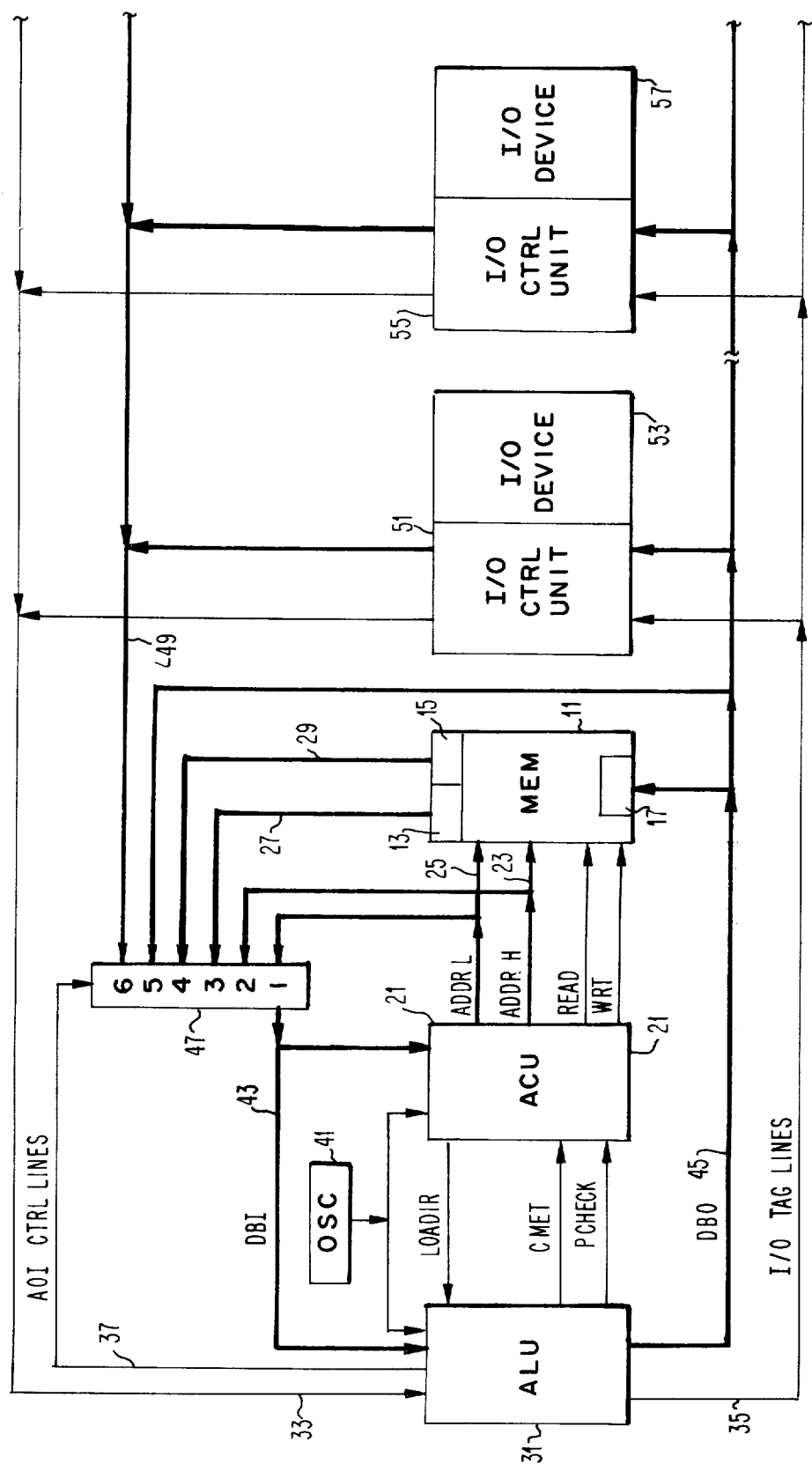
FIG. 1 shows a system organization of a general purpose data processing engine organized in accordance with the invention.

Referring now to FIG. 1, a data processing engine embodied according to the system organization of the invention is shown including an LSI memory chip 11 for storing instructions and data. The processor of this preferred embodiment utilizes a 16 bit instruction and, therefore, the memory may be advantageously organized as a plurality of 8 bit bytes. Memory 11 includes even and odd byte data output registers 13 and 15 which provide two bytes of information whenever an even address is selected in conjunction with a read input signal. Memory 11 also includes a one byte data input register 17 which temporarily stores a byte of information as it is being transferred into any even or odd memory location selected by the signals on ADDRL and ADDRH address buses 25 and 23 in conjunction with a write input signal.

In order to provide the read and write signals and the ADDRL and ADDRH signals to memory 11, an address control unit subprocessor 21 is provided which has a one byte wide information bus input connection to data bus in DBI 43 for receiving instructions and addresses from memory 11 and address information from a second arithmetic and logic unit subprocessor 31. Address control unit 21 includes an instruction counter 107 and a storage address register 109 each of which can provide the two bytes of information which are propagated from address bus outputs ADDRL 25 and ADDRH 23. Address control unit 21 also includes instruction decoding means in the form of OP decoding circuits 103 and execution sequencing means 105 for generating a read or a write signal to memory 11 in conjunction with the selected address. The instruction decoding means also provides a signal on the line labeled LOADIR so that an instruction which is loaded into ACU 21 is simultaneously loaded into ALU 31. ACU 21 has an input line labeled CMET for receiving a function modification signal from ALU subprocessor 31 to modify the execution sequence of an instruction being executed, dependent upon the signal received thereover. The function modifying signal will usually be the result of a condition having been met by the results of a calculation performed by the arithmetic and logic decision circuits 207 of ALU 31 such as compare equal, compare high, overflow, or carry or a like test.

A parity check signal input line labeled PCHECK is provided between ALU 31 and ACU 21 for providing an indication that ALU 31 detected incorrect parity at its information input data bus in DBI 43, or at some other convenient points. The preferred embodiment being described uses simple odd parity for which parity generating circuits and parity detecting circuits are well known. Each of the LSI circuits such as memory 11, ACU 21, ALU 31 and I/O device control units 51 and 55 contain odd parity generating circuits at their output buses and parity detecting circuits at their input bus connections. In order to implement the odd parity, each 8 bit byte wide data bus includes a 9th signal line for carrying the parity information. Because odd parity is so well known to those skilled in the art of logic design, the parity generating and detecting circuits are not disclosed or described in this specification in the interests of clarity and brevity.

The system organization of the instant invention can be implemented using any logic family which the designer desires to chose. However, in each case some timing or clock signals will be necessary to prevent logic race conditions. Therefore, it is advantageous to employ the same oscillator 41 as an additional synchronizing signal connected to both ACU 21 and ALU 31 in addition to the LOADIR synchronizing signal from ACU 21 to ALU 31. Oscillator 41 is a simple crystal-controlled circuit which provides a plurality of output signals at the same frequency but at a varying phase relationship with respect to each other.

The preferred embodiment being described is implemented in dynamic logic circuits, examples of which are described in the cross referenced patent applications incorporated by reference. Dynamic logic circuits have a finite predictable delay between the time an input is applied and the time an output is available which is used to advantage in ALU 31 to eliminate the need for a data output register or accumulator on ALU 31 LSI circuit chip. Information gated into ALU 31 during one execution cycle will be available at information output connection data bus out DBO 45 during the next following execution cycle because one execution cycle delay time is required for the information to propagate through the dynamic logic circuits 207 of ALU 31.

As shown in FIG. 1, the second or arithmetic logic unit subprocessor ALU 31 connected between information input data bus in DBI 43 and information output data bus out DBO 45 to perform arithmetic and logical calculations on information from memory 11 or address information from ACU 21. Arithmetic logic unit 31 also includes instruction decoding means to decode each instruction OP code and sequence execution of the instruction by generating input information gating signals to AND OR invert logic circuits 47 which sequentially connect address buses ADDRL 25, ADDRH, 23, memory output buses 27 and 29 from memory output registers 13 and 15, data bus out DBO 45, and I/O bus in 49 to data bus in DBI 43 under control of an instruction being simultaneously executed in arithmetic logic unit 31 and address control unit 21.

The AND OR invert logic circuits 47 may be implemented on a separate LSI chip or in a preferred embodiment may be distributed at the output bus of each of the chips connected to data bus in DBI 43. When AOI circuits 47 are distributed to each chip, their control lines must also be distributed to those chips so connected which do not have an instruction decode means to generate its own AOI control signals redundantly on the chip. FIG. 1 shows AOI circuits 47 on a separate chip because they were implemented in that manner when the invention was reduced to practice. The three control lines 37 carry encoded control signals in the form of binary counts from one to six, to connect one of the six input busses to data bus in DBI 43. The counts one through six connect busses 25, 23, 27, 29, 45, and 49 to data bus in 43 respectively.

The instruction decoding means of arithmetic logic unit 31 is also connected to a plurality of I/O tag lines 35 for identifying the information bit patterns in a byte of information placed on data bus out DBO 45 by arithmetic logic unit 31 as an I/O device address, and I/O device command, or I/O device data, or the data placed on I/O bus in 49 by control unit 51 or 55. A valid line 33 also is recieved from control units 51 and 55 to indicate valid parity of recieved information.

Figure 2:
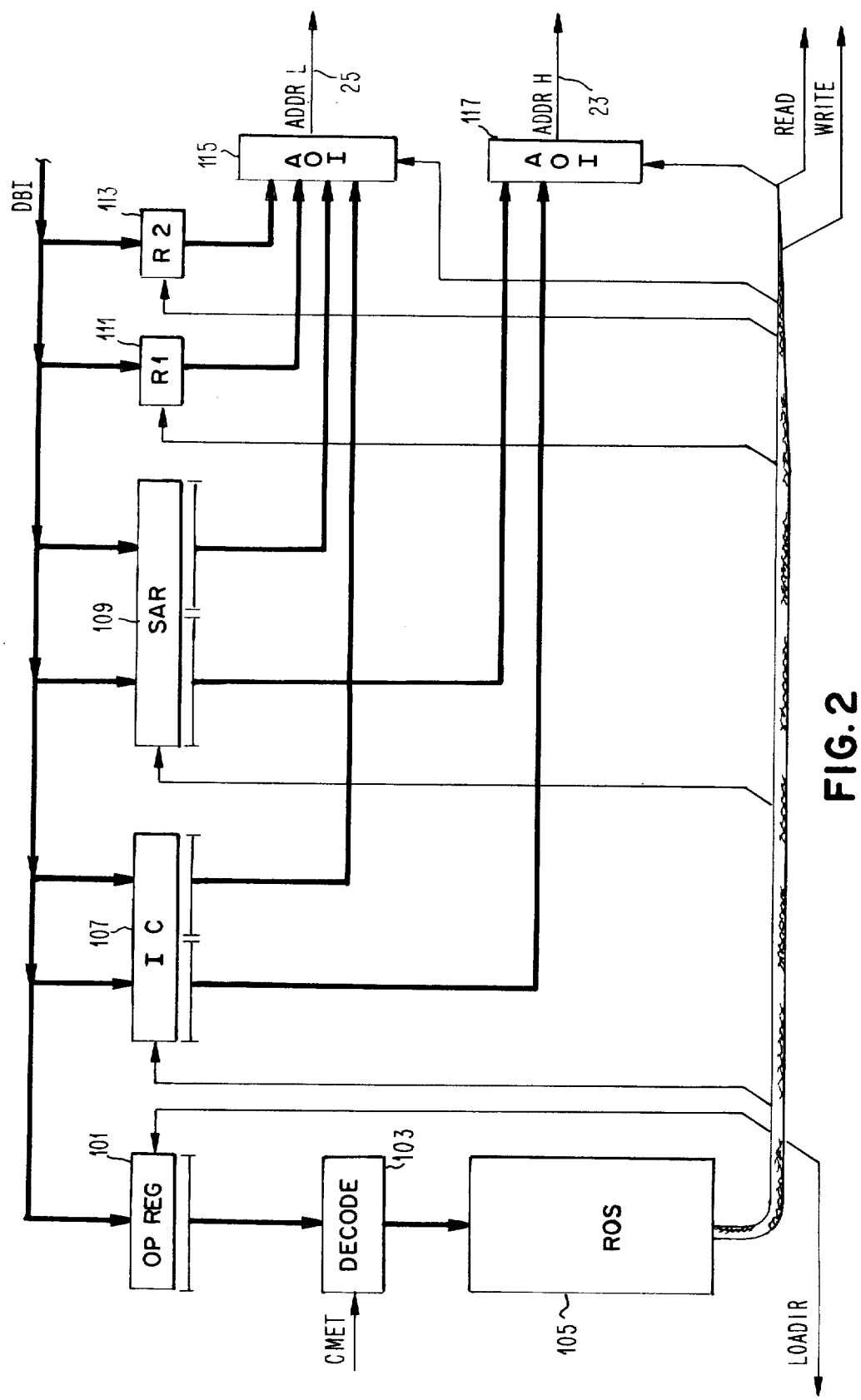
FIG. 2 is a block diagram of a subprocessor which performs the functions of memory address control and loading each instruction into each subprocessor.

Referring now to FIG. 2, a more detailed description of the logic circuits necessary to implement the functions within address control unit 21 will be described.

In order to provide the sequence of control signals necessary to control memory 11 in response to an instruction, an OP code register 101 is provided for storing the operation code portion of an instruction. OP code register 101 has data inputs connected to data bus in 43 and a load control input connected to an output of self-sequencing read only storage 105. A data output from each bit position of OP code register 101 is connected to inputs of OP code decoding gates 103 which decode the binary bit pattern of an OP code into at least one of a plurality of signals on signal lines connected to self-sequencing read only storage 105. Each signal line input into self-sequencing read only storage 105 activates a different execution sequence to execute each different OP code. The instruction decoding means of this preferred embodiment advantageously uses the self-sequencing memory of U.S. Pat. application Ser. No. 334,796 filed Feb. 22, 1973. However, it will be recognized by those skilled in the art of logic design that a more conventional read only storage or read write memory may be used in conjunction with an address counter or other sequencing means to generate the plurality of sequential control signals provided at the output of read only storage 105. Alternatively, one skilled in the art of logic design might use a conventional timing clock or counter in conjunction with a logic decision tree circuit or sequential latches to generate the sequences of control pulses to be initiated by each different OP code of each instruction.

Referring again to decode circuitry 103, the function modifier input signal CMET is connected thereto as an input. This signal is coupled through decode 103 to an input of at least one sequence of read only storage 105 such as input C in FIG. 1 of the above referenced patent application. CMET provides additional output from ROS 105 such as to load the instruction counter during a jump on condition and so forth. Read only storage ROS 105 has a plurality of output lines, some of which are labeled LOADIR, READ, WRT, etc. Others of these lines are not labeled but are connected directly to logic within ACU 21 which they control such as instruction counter 107 and address output gates 115 and 117. Instruction counter 107 for example has three input lines from read only storage 105, two for loading instruction counter 107 from data bus in 43 with two bytes and the other for incrementing instruction counter 107 to a next sequential instruction address. Instruction counter 107 includes 16 counting stages, 8 of which are connected through address output AND OR invert logic gates 115 to address low ADDRL bus 25 and the remaining 8 are connected through AND OR invert gates 117 to address high ADDRH bus 23.

Likewise, storage address register 109 has two load inputs connected from the output of read only storage 105 for loading the two address bytes into storage address register 109 from the data bus in 43 with the address of a storage location in the memory which contains information to be utilized as an operand in a calculation or as an address, etc. Storage address register 109 like instruction counter 107 is 16 bits wide and, therefore, has a low order byte connected through AOI 115 to ADDRL 25 and the high order byte connected through AOI 117 to address high bus ADDRH 23.

Registers 111 and 113 which store the operand identifier portions R1 and R2 of an instruction likewise have load control inputs connected from read only storage 105 so that registers 111 and 113 can be loaded with the register fields of an instruction from data bus in 43. In this preferred embodiment R1 and R2 registers 111 and 113 each contain four bit positions corresponding to lowest order memory addresses. Thus, for example, when a lowest order 4 bit pattern from register 111 is gated through address output gates 115 along with binary zero higher order bits, under control of ROS 105, a low order memory location will be selected which contains an operand specified by this instruction.

Figure 3:
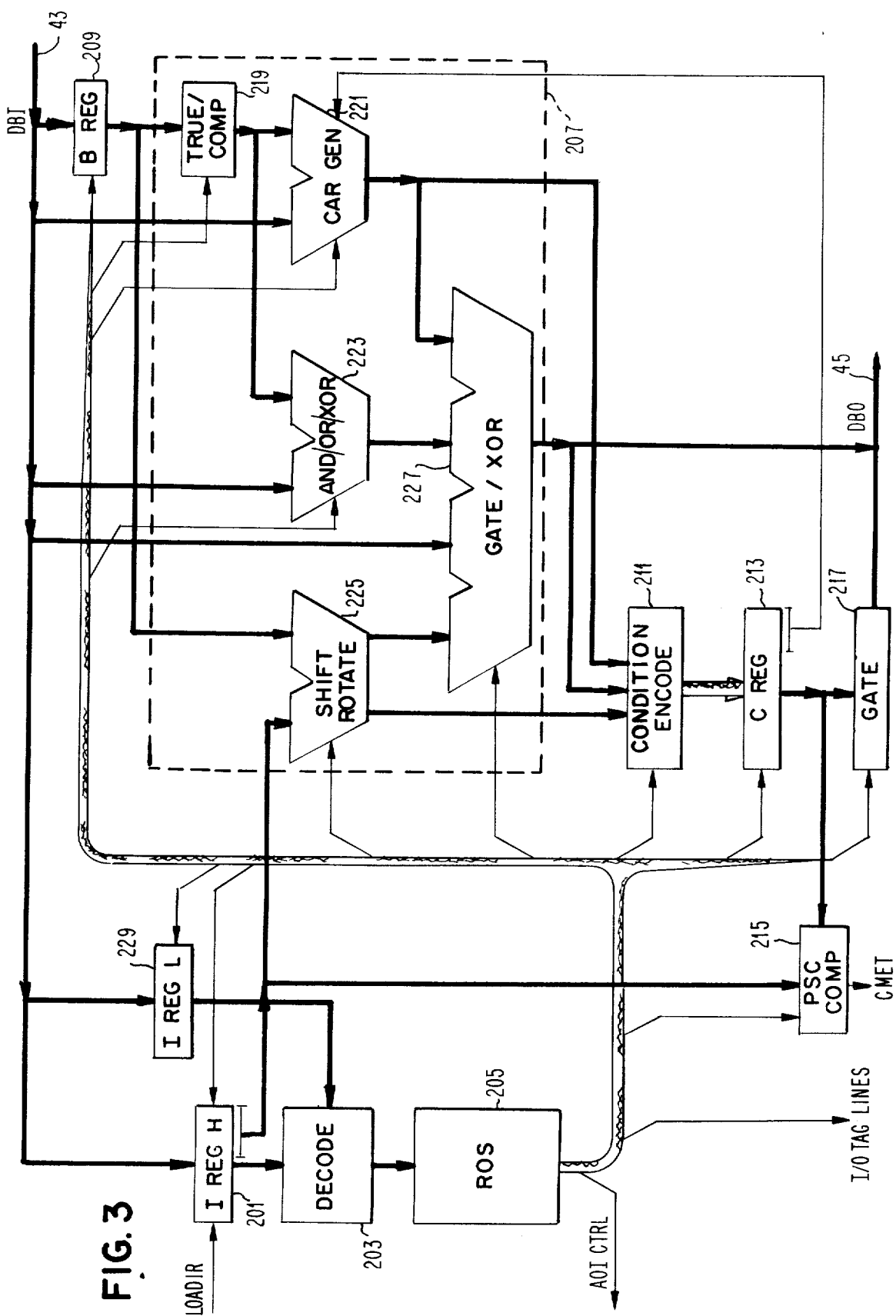
FIG. 3 shows a subprocessor which performs the functions of arithmetic and logic calculation, function modifier condition calculation, and controls the flow of information to and from input output devices.

Referring now to FIG. 3, a more detailed description of the logic required to perform the subprocessor functions of ALU 31 will be described. A high order byte register 201 is provided for storing the OP code portion of an instruction being executed by ALU 31. Register 201 also stores a count or mask field of an instruction. The OP code in register 201 is decoded by decode circuits 203 to activate one or more execution sequences within ROS 205 in a manner identical to that previously described for ROS 105 with respect to FIG. 2. The input to decode 203 labeled LOADIR likewise activates an additional sequence within ROS 205 to modify the execution of an instruction being executed so as to load a portion of the next instruction to be executed into register 201. The low order byte of the instruction is stored in register 229 so that ALU 31 can connect the even or odd memory bus out 27 or 29 dependent upon whether R1 and R2 are even or odd. Like the OP code execution of ACU 21, decode 203 and ROS 205 could be replaced with a counter and logic gates as described with respect to FIG. 2.

As shown in FIG. 3, output signals from ROS 205 energize the previously described control lines 38 to AOI 47 and I/O tag lines 35 for identifying the bit patterns on data bus out 45 and on I/O bus in 49. In addition to these external control functions, outputs of ROS 205 are connected to the program status code comparator 215, condition code output gate 217, condition code register 213, encoding circuits 211, various logic circuits of arithmetic and logic decision block 207 and the load control inputs of registers 201, 209, and 229. In order to store an operand which will be used to perform an arithmetic or logical calculation or decision, an operand register in the form of B register 209 is provided with data inputs connected to data bus in 43 for loading the register 209 under control of a signal LOADBREG from ROS 205. A data output from each bit position of register 209 is connected to inputs of true complement logic 219 and shift rotate logic 225. True complement logic 219 is straightforward AND OR gates controlled by two output signals from ROS 205 to provide the true or the one's complement bit pattern of data stored in register 209. An output from true complement logic 219 corresponding to each bit position of register 209 is connected to AND/OR/XOR 223 and carry generator 221. AND/OR/XOR 223 and carry generator 221 each have a second bus input connected to data bus in 43 to perform the functions of logical AND, logical OR, logical exclusive OR, and carry generation for arithmetic addition. AND/OR/XOR 223 and carry generator 221 each have a plurality of control inputs connected to outputs of read only storage 205 to control which, if any, of the above recited functions are to be executed. Shift rotate 225 also has a second data bus input connected to a plurality of bit positions of register 201 which may store a count used in conjunction with a shift or a rotate OP code. The count specifies the number of bit positions which the contents of register 209 is to be shifted or rotated. Shift rotate 225 is also controlled by two control lines from read only storage 205 to execute a shift function or execute a rotate function. GATE/XOR 227 is also a plurality of AND, OR and exclusive OR gates having inputs connected to data bus in 43, carry generator 221, AND/OR/XOR 223, and shift rotate 225 and a plurality of control inputs from read only storage 205 for gating information directly through to data bus out 45 or performing exclusive OR combinations of information received from the above mentioned inputs. Carry generator 221 also has an input from the carry bit position of condition register 213 so that the carry out of a previous arithmetic addition can be added into the arithmetic addition of higher order bytes of a number in the form of two or more bytes. The exclusive OR gates of 223 and 227 in combination with carry generator 221 perform arithmetic addition and, when combined with the function of true complement logic 219 also perform the function of subtraction.

In order to provide signals which can be used by ALU 31 and ACU 21 for modification of the execution of a plurality of instructions such as remaining in or exiting from a program loop, program status code compare circuits 215 are provided for comparing the contents of condition register 213 with a portion of the contents of register 201 which may contain a mask bit pattern. The contents of condition register 213 is received from condition encoding logic 211 which has inputs connected to shift rotate 225, GATE/XOR 227 and carry generator 221. Condition encode logic 211 may be implemented in any of a number of well known ways to detect whether its input signals are positive, zero, high, overflow bits, or meet some other condition upon which it is desired to take specific action such as a carry. In the event the condition occurs, it will be detected by condition encode logic 211, stored in condition register 213 for comparison with the mask bits in register 201 by program status compare logic 215 or gated out to data bus out 45 by gate 217, all under control of execution sequencing output signals from read only storage 205. The output of program status code compare 215 is the function modifying signal CMET which is connected to a corresponding input to ACU 21 for modifying execution of an instruction in ACU 21.

Operation of the Preferred Embodiment of the Invention

Although the format of the following instructions, which will be used as examples to explain the operation of the invention, are specific to a 4 bit operation code, an 8 bit immediate field, 4 bit operand identifying fields, and 4 bit mask or cout fields, it will be recognized by those skilled in the art of data processing that other instructions formats could have chosen along with modification in the form of their associated registers in FIGS. 2 and 3 without departing from the spirit and scope of the invention.

For purposes of example, each execution step required for the sequential execution of the three instructions: add register to register, store register, and jump on condition, will be explained in detail with the aid of table 1, which shows only those ROS output signals necessary for these instructions. Also for purposes of this example, it is assumed that memory 11 is a relatively fast memory and is able to provide a data byte or bytes at its output register 13 and 15 within a relatively short time after receiving an address. Making this assumption, simplifies the explanation in that the complexities introduced by the concept known as pipe-lining, which would otherwise have to be used, can be avoided in this specification. It will be recognized by those skilled in the art that the organization of the invention will work equally well with or without a high speed memory. In order to execute a register to register add instruction, the four bit OP code portions of the instruction will have been simultaneously decoded by decode gates 103 and 203 to activate the proper execution sequence in ROS 105 and ROS 205 which is shown in the following table 1.

TABLE 1

|  | Add | | | | | Store Execution Cycles | | | | | | Jump | | | | | |
| --- | --- | --- | --- | --- | --- | --- | --- | --- | --- | --- | --- | --- | --- | --- | --- | --- | --- |
| 105 Outputs | 1 | 2 | 3 | 4 | 5 | 1 | 2 | 3 | 4 | 5 | 6 | 1 | 2 | 3 | 4 | 5 | 6 |
| LOADIR | 0 | 0 | 1 | 0 | 0 | 0 | 0 | 0 | 1 | 0 | 0 | 0 | 0 | 0 | 1 | 0 | 0 |
| LOADOPREG | 0 | 0 | 0 | 1 | 0 | 0 | 0 | 0 | 0 | 1 | 0 | 0 | 0 | 0 | 0 | 1 | 0 |
| LOADICH | 0 | 0 | 0 | 0 | 0 | 0 | 0 | 0 | 0 | 0 | 0 | 0 | 0 | 0 | 1 | 0 | 0 |
| LOADICL | 0 | 0 | 0 | 0 | 0 | 0 | 0 | 0 | 0 | 0 | 0 | 0 | 1 | 0 | 0 | 0 | 0 |
| LOADSARH | 0 | 0 | 0 | 0 | 0 | 1 | 0 | 0 | 0 | 0 | 0 | 0 | 0 | 0 | 0 | 0 | 0 |
| LOADSARL | 0 | 0 | 0 | 0 | 0 | 0 | 1 | 0 | 0 | 0 | 0 | 0 | 0 | 0 | 0 | 0 | 0 |
| LOADR1 | 0 | 0 | 0 | 0 | 1 | 0 | 0 | 0 | 0 | 0 | 1 | 0 | 0 | 0 | 0 | 0 | 1 |
| LOADR2 | 0 | 0 | 0 | 0 | 1 | 0 | 0 | 0 | 0 | 0 | 1 | 0 | 0 | 0 | 0 | 0 | 1 |
| GATEIC | 0 | 0 | 0 | 1 | 0 | 0 | 0 | 0 | 0 | 1 | 0 | 1 | 0 | 1 | 0 | 1 | 0 |
| GATESAR | 0 | 0 | 0 | 0 | 0 | 0 | 0 | 1 | 0 | 0 | 0 | 0 | 0 | 0 | 0 | 0 | 0 |
| GATER1 | 0 | 1 | 1 | 0 | 0 | 0 | 0 | 1 | 0 | 0 | 0 | 0 | 0 | 0 | 0 | 0 | 0 |
| GATER2 | 1 | 0 | 0 | 0 | 0 | 1 | 0 | 0 | 0 | 0 | 0 | 0 | 0 | 0 | 0 | 0 | 1 |
| STEPIC | 0 | 0 | 0 | 0 | 1 | 0 | 0 | 0 | 0 | 0 | 1 | 0 | 0 | 0 | 0 | 1 | 0 |
| READ | 1 | 1 | 0 | 1 | 0 | 1 | 0 | 1 | 0 | 1 | 0 | 0 | 0 | 0 | 0 | 0 | 0 |
| WRITE | 0 | 0 | 1 | 0 | 0 | 0 | 0 | 0 | 1 | 0 | 0 | 0 | 0 | 0 | 0 | 0 | 0 |
| 205 outputs | | | | | | | | | | | | | | | | | |
| LOADIREGH | 0 | 0 | 0 | 1 | 0 | 0 | 0 | 0 | 0 | 1 | 0 | 0 | 0 | 0 | 0 | 1 | 0 |
| LOADIREGL | 0 | 0 | 0 | 0 | 1 | 0 | 0 | 0 | 0 | 0 | 1 | 0 | 0 | 0 | 0 | 0 | 1 |
| LOADBREG | 1 | 0 | 0 | 0 | 1 | 0 | 0 | 0 | 0 | 0 | 1 | 0 | 0 | 0 | 0 | 0 | 1 |
| GATETRUE | 0 | 1 | 0 | 0 | 0 | 0 | 0 | 0 | 0 | 0 | 0 | 1 | 0 | 0 | 0 | 0 | 0 |
| XOR223 | 0 | 1 | 0 | 0 | 0 | 0 | 0 | 0 | 0 | 0 | 0 | 1 | 0 | 1 | 0 | 0 | 0 |
| CARRY | 0 | 1 | 0 | 0 | 0 | 0 | 0 | 0 | 0 | 0 | 0 | 1 | 0 | 0 | 0 | 0 | 0 |
| CARRYIN | 0 | 0 | 0 | 0 | 0 | 0 | 0 | 0 | 0 | 0 | 0 | 0 | 0 | 1 | 0 | 0 | 0 |
| GATEDBI | 0 | 0 | 0 | 0 | 0 | 0 | 0 | 1 | 0 | 0 | 0 | 1 | 0 | 1 | 0 | 0 | 0 |
| XOR223CAR | 0 | 1 | 0 | 0 | 0 | 0 | 0 | 0 | 0 | 0 | 0 | 1 | 0 | 1 | 0 | 0 | 0 |
| ENCODECAR | 0 | 1 | 0 | 0 | 0 | 0 | 0 | 0 | 0 | 0 | 0 | 1 | 0 | 1 | 0 | 0 | 0 |
| CMETCOMP | 0 | 0 | 0 | 0 | 0 | 0 | 0 | 0 | 0 | 0 | 0 | 1 | 1 | 0 | 1 | 1 | 0 |
| AOIONE | 1 | 1 | 0 | 1 | 0 | 1 | 0 | 1 | 0 | 1 | 0 | 0 | 0 | 1 | 0 | 1 | 0 |
| AOITWO | 1 | 1 | 0 | 1 | 0 | 1 | 0 | 1 | 0 | 1 | 0 | 0 | 0 | 1 | 0 | 1 | 0 |
| AOIFOUR | 0 | 0 | 0 | 0 | 1 | 0 | 1 | 0 | 0 | 0 | 1 | 0 | 1 | 0 | 1 | 0 | 1 |

The first add instruction execution cycle GATER2 and READ outputs from ROS 105 will cause the contents of R2 register 113 to be placed on ADDRL bus 25 as the low order bits of the address of register space in memory 11 which will be read to obtain the first operand. For purposes of this example, ROS 105 will control gates 115 and 117 to provide binary zero bits on the twelve highest order address bit position lines thereby selecting a relatively low order storage location. The contents of the memory location addressed by the bit pattern in register 113 will be read out to memory output register 13 or 15 dependent upon whether the byte location selected is an even or odd byte. The low order byte of the instruction which includes the R1 and R2 fields is available to ALU 31 in I REG L 229, allowing decode 203 to select a first or a second sequence in ROS 205 depending upon whether the R field is selecting an odd or an even byte. AOI control lines 37 then connect bus 27 or bus 29 to bus in 43 dependent upon whether an even or an odd register space storage location in memory 11 was selected. During execution cycle one ALU 31 also controls B register 209 to load the byte of data received from memory 11 over data bus in 43. During execution cycle two the steps performed during cycle one are repeated with the exception that the contents of register 111 are placed on address bus low 25 and the data received from memory 11 is not stored in B register 209 but is made directly available from data bus in 43 to exclusive OR circuits 223 and carry generator 221 which generate a partial sum and carry in response to GATETRUE, XOR223, and CARRY control outputs from ROS 205. The output of exclusive OR 223 and carry generator 221 are again combined by exclusive OR circuit 227 under control of the XOR223CAR control output from ROS 205 to provide the final sum and the high order carry out, if any, which is transferred from carry generator 221 through condition encode 211 by the ENCODECAR control line to condition register 213 while the output of exclusive OR circuit 227 becomes available on data bus out 45. Since this embodiment uses dynamic logic, it takes one execution cycle for the resultant sum to appear on data bus out 45. During the next execution cycle three, the contents of register 111 is again placed on address bus low 25 to again select the second operand storage location while activating the write WRT control line to memory 11 to transfer the contents of register 17 of memory 11 into the selected storage location. ROS 105 also generates the LOADIR output to synchronize ROS 205 to load an instruction during the next cycle. During the next execution cycle four, the contents of instruction counter 107 is placed on address buses 25 and 23 to select the next sequential instruction to be executed. Since instructions are always sixteen bits long in this example, they are always addressed by an even address which selects both an even storage location and the following odd storage location. The READ signal to memory 11 causes the contents of the selected storage locations to be placed in output register 13 and 15 and the fist byte of the instruction is loaded into OP register 101 and I REG H 201. During the fifth execution cycle, the odd byte of the instruction is loaded into R1 and R2 registers 111 and 113, B register 209 and I REG L 229. Because the entire instruction was read out to registers 13 and 15 during cycle four, the instruction counter 107 can be stepped during cycle five to point to the next sequential instruction, which is store in this example.

The add register to register with carry instruction is executed with the same execution steps as those taken for the previously described add register to register execution with the exception that the carry bit from a previous add instruction stored in condition register 213 is caused to be transferred from condition register 213 to the low order bit input of carry generator 221. In this manner a 16 bit number can be added to another 16 bit number with two sequentially executed add register to register instructions.

The store register memory instruction includes a four bit OP code now in registers 101 and 201, an R1 four bit operand identifier field, now storage register 111 which identifies the register space memory location of the register whose contents is to be stored in memory, and a second four bit operand field R2, now in register 113 which identifies the register space storage location of the register which contains the memory address where the contents of the first register is to be stored. During cycle one of the store register to memory instruction, outputs of ROS 105 cause AOI gates 115 and 117 to place the contents of register 113 on the four low order output lines of ADDRL 25 and binary zero bits on the remaining lines of busses 25 and 23 while at the same time activating the load control input to storage address register 109 so that data bus out 43 is connected to load the high order bit positions of storage address register 109. During this same execution cycle one, ROS 205 conditions AOI control lines 37 to connect even memory bus OUT 27 to data bus in 43. During the next execution cycle two, ROS 105 conditions a second load input to storage address register 109 to load the low order bit positions from data bus in 43, and ROS 205 activates AOI control lines 37 with a binary four code to connect odd memory bus out 29 to data bus in 43. During the third execution cycle, ROS 105 places the contents of R1 register 111 in the low order bit positions of ADDRL 25 and again causes zero bits to appear on the remaining higher order bit positions while ROS 205 activates AOI control lines 37 to connect the even or odd memory bus out 27 or 29 depending upon whether the contents of the R1 field in I REG L 229 is an even or an odd number. The proper memory bus is connected by AOI gates 47 to data bus in 43 ehile the GATE BI output from ROS 205 is active to propagate the byte of data to be stored from data bus in 43 to data bus out 45 which takes on execution cycle time. During the fourth execution cycle, ROS 105 opens gates 115 and 117 to place the contents of storage address register 109 on addresses busses 25 and 23 and activates the WRT output to memory 11 to store the byte propagating through ALU 31. Execution cycles five and six to retrieve the next sequential instruction are identical to the Add cycles four and five previously described.

The jump on condition instruction also includes a four bit OP code field, a four bit mask field and an eight bit immediate field. Reference to table 1 shows that ROS 105 gates the instruction counter 107 through the address output gates 115 and 117 during cycle one. ROS 205 activates AOIONE, GATETRUE, XOR223, CARRY, and XOR223CAR to add the immediate field from B register 209 to the low order byte from the instruction counter 107. The high order carry out bit if any is stored in condition register 213 via condition encoded 211 by ENCODECAR from ROS 205.

In order to compare the contents of other fields such as zero, overflow, or high in CREG 213 with the mask field in I REG H 201, ROS 205 activates program status code compare circuits 215 to generate a CMET signal if a one bit is found in CREG 213 positions corresponding to one bits in corresponding positions of the mask field. The CMET signal activates a supplementary sequence in ROS 105 to load the low order stages of instruction counter 107 with the new instruction address during the next cycle two when the sum is available at data bus out 45. The sum is gated from data bus out 45 through AOI 47 to data bus in 43 by AOIONE and AOIFOUR signals on AOI control lines 37. Execution cycle three is the same as cycle one with the exceptions that ADDRH is used to bring in the high order address byte which is added with zeros since neither a GATETRUE nor a GATECOMP signal is active to true complement circuits 219 but the CARRYIN and XOR223CAR control signals cause carry generator 221 and gate 227 to combine the carry bit from the previous low order byte addition with the high order byte from gate 223. This sum is again sent through AOI 47 by AOIONE and AOIFOUR and stored by LOADICH into the instruction counter 107 high order positions during cycle 4 if CMET is received. Cycles five and six are the same as the previously described cycles which bring in the new instruction. If CMET was generated, the jumped to instruction will be loaded and if the condition was not met, the originally incremented contents of instruction counter 107 will bring in the next sequential instruction.

It will be understood by those skilled in the art of data processor design that the variously suggested changes in the form of AOI circuits 47, in the format of instructions, and in the number of subprocessors utilized or other details of embodiment may be made without departing from the spirit and scope of the invention.

What is claimed is:

1. A data processing system comprising:
  a memory for storing instruction information and data information, said memory having an information output, an information input, and an address input;
  a first subprocessor having a first information input and an address output, said first information input being connected to said information output of said memory, said address output being connected to said address input of said memory;
  said first subprocessor having an OP register for storing the operation code portion of an instruction, an input to said OP register being connected to said first information input;
  said first subprocessor further having first instruction decoding means connected to outputs from said OP register for decoding an instruction received from said memory means, said first decoding means having a function modifier input for receiving a signal for modifying the function specified by said instruction;
  a second subprocessor time synchronized to said first subprocessor, said second subprocessor having a second information input and an information output, said second information input being connected to said information output of said memory, said information output of said second subprocessor being connected to said information input of said memory;
  said second subprocessor having a second OP register for storing the operation code portion of an instruction, an input to said second OP register being connected to said second information input;
  second instruction decoding means connected to said second OP register for decoding said instruction;
  an operand register having a load input connected to outputs of said second instruction decoding means for loading said operand register from said second information input when an operand is to be stored therein;
  arithmetic and logic decision circuits having a plurality of inputs connected to outputs of said second instruction decoding means for performing arithmetic and logic decisions upon data received from an input connected to said operand register and information received from an input connected to said second information input of said second subprocessor, an output of said arithmetic and logic decision circuitry being connected to said information output of said second subprocessor;
  and function modifying logic having inputs connected to said arithmetic and logic decision circuits, responsive to data information from said memory, an output from said function modifying logic being connected to said function modifier input of said first decoding means;
  whereby each of said subprocessors is functionally responsive in a different predetermined manner to said instruction to perform a data processing operation as specified by said instruction upon information from said memory.

2. The data processing system of claim 1 wherein said first subprocessor further comprises:
  an instruction counter having an increment input and a load input connected to outputs of said first instruction decoding means for incrementing said instruction counter when a next sequentially stored instruction in said memory is to be executed and for loading said instruction counter from said first information input when a nonsequential instruction is to be executed;
  a storage address register having an input connected to said first instruction decoding means and an input connected to said first information input for loading said storage address register from said first information input with an address of a storage location in said memory;
  address output gates controlled by said first instruction decoding means for connecting said instruction counter and said storage address register to said address output of said first subprocessor.

3. The data processing system of claim 2 wherein said first subprocessor further comprises:
  at least one operand identifying register having a load input connected to said first instruction decoding means for loading said operand identifying register from said first information input with operand identifier bits which are part of an instruction.

4. The data processing system of claim 3 wherein said operand identifying register has an output connected to said address output gates of said first subprocessor for transferring the contents of said operand identifying register to said address input of said memory as an identifying portion of an address which in combination with a predetermined remaining portion of said address provided by said address gates, specifies a unique storage location in said memory whereby less than an entire address need be included in said instruction.

5. The data processing system of claim 2 wherein said first instruction decoding means comprises OP code decoding means for energizing at least one of a plurality of signal lines in response to the operation code portion of an instruction;
   self sequencing read only storage means for sequentially generating a plurality of output signals to control said instruction counter, said storage address register, and said address output gates to execute said instruction.

6. The data processing system of claim 5 wherein said function modifier input is connected to said OP code decoding means for modifying said sequence of control signals generated by said self sequencing read only storage means.

7. The data processing system of claim 1 wherein said second subprocessor is time synchronized to said first subprocessor by the receipt of a load instruction register signal by said second OP register from said first subprocessor.

8. The data processing system of claim 1 wherein said function modifying logic further comprises:
   condition encoding means for encoding a function modifying condition detected from a result provided by said arithmetic and logic decision circuits;
   a condition register connected to said condition encoding means for storing conditions detected by said condition encoding means;
   compare means having inputs connected to said condition register to generate said function modifying signal.

* * * * *